US012630407B2

(12) United States Patent
Skocypec et al.

(10) Patent No.: US 12,630,407 B2
(45) Date of Patent: May 19, 2026

(54) DISPENSE AND LEAK DETECTION SYSTEMS AND METHODS

(71) Applicant: HYDRATION LABS, INC., Charlestown, MA (US)

(72) Inventors: David Skocypec, Charlestown, MA (US); Chad Woodrow, Charlestown, MA (US); David Watt, Charlestown, MA (US)

(73) Assignee: HYDRATION LABS, INC, Charlestown, MA (US)

( * ) Notice: Subject to any disclaimer, the term of this patent is extended or adjusted under 35 U.S.C. 154(b) by 99 days.

(21) Appl. No.: 18/812,920

(22) Filed: Aug. 22, 2024

(65) Prior Publication Data

US 2026/0054975 A1      Feb. 26, 2026

(51) Int. Cl.
B67D 1/08 (2006.01)
G01M 3/26 (2006.01)

(52) U.S. Cl.
CPC ......... B67D 1/0878 (2013.01); B67D 1/0888 (2013.01); G01M 3/26 (2013.01)

(58) Field of Classification Search
None
See application file for complete search history.

(56) References Cited

U.S. PATENT DOCUMENTS 4,393,878 A * 7/1983 Kahn ..................... A61B 5/031
600/561
4,441,357 A * 4/1984 Kahn ..................... G01M 3/26
73/40

11,221,270 B2 * 1/2022 Evans ..................... G01M 3/28
2008/0189078 A1 8/2008 Vok et al.
2010/0139779 A1 * 6/2010 Lautzenheiser ........... E03C 1/04
137/511

(Continued)

FOREIGN PATENT DOCUMENTS

WO      WO-2018044415 A1 * 3/2018 ............. G06Q 20/18

OTHER PUBLICATIONS

International Search Report and Written Opinion received in International application No. PCT/US25/41711 mailed on Oct. 22, 2025.

*Primary Examiner* — Frederick C Nicolas
*Assistant Examiner* — Michael J. Melaragno
(74) *Attorney, Agent, or Firm* — BRADLEY ARANT BOULT CUMMING LLP; Adam J. Thompson

(57) ABSTRACT

The system can include an inlet valve, a backflow preventer, and a demand pump. The system can further include a first pressure sensor coupled to a computing device and configured to measure pressure between the backflow preventer and the inlet valve. The system can further include a second pressure sensor coupled to a computing device and configured to measure pressure between the backflow preventer and at least one dispensing valve. The computing device can detect that a fluid dispensing event has completed based on a pressure measurement from the second pressure sensor. After a predefined duration from the end of the fluid dispensing event, the computing device can determine measurements at the first pressure sensor and the second pressure sensor. The computing device can determine a leak in a fluid pathway based on a change in a pressure measurement from the first pressure sensor or the second pressure sensor.

20 Claims, 7 Drawing Sheets

(56)                    References Cited

U.S. PATENT DOCUMENTS

| | | |
|---|---|---|
| 2018/0280896 A1 | 10/2018 | Perkins et al. |
| 2020/0031654 A1 | 1/2020 | Wing et al. |
| 2020/0298581 A1* | 9/2020 | Hara .................... B41J 2/17563 |
| 2023/0360465 A1 | 11/2023 | Hurd et al. |
| 2023/0383734 A1* | 11/2023 | Beavis ................. G05D 7/0676 |
| 2024/0094084 A1* | 3/2024 | Bertrand ................. E03B 7/077 |
| 2025/0136424 A1* | 5/2025 | Woodrow ........... G01M 3/2876 |
| 2025/0196031 A1* | 6/2025 | McAdams ............. B67D 1/125 |
| 2025/0347453 A1* | 11/2025 | Bunnell ............. H01M 10/613 |

* cited by examiner

DISPENSE AND LEAK DETECTION SYSTEMS AND METHODS

TECHNICAL FIELD

The present systems and processes relate to detecting dispensing events and leaks in beverage dispensing devices.

BACKGROUND

Some beverage dispensing devices can include multiple computing devices for controlling the different hardware components. However, connecting the multiple computing devices to enable communication between one another may not be possible. For example, multiple computing devices may not be connected due to cost or space limitations. As another example, multiple computing devices may not be connected due to the chances of damage to those connections. Therefore, a computing device controlling a demand pump may not receive inputs from a second computing device controlling a dispensing valve. Additionally, even if a computing device controlling a demand pump is connected to a computing device controlling a dispensing valve, the computing device controlling the demand pump may need to be able to detect dispensing events without receiving inputs from the computing device controlling a dispensing valve.

Further, beverage dispensing devices can be susceptible to leaks in fluid pathways. Prolonged or undetected leaks can cause damage or disable a beverage dispensing device. Thus, detecting leaks in a timely manner is necessary to protect beverage dispensing devices from damage. Additionally, some demand pumps are controlled by integrated pressure switches that turn the demand pump on or off based on the pressure at the outlet of the demand pump falling below or exceeding a predefined pressure threshold. If a leak occurs and pressure drops, the integrated pressure switch can cause the demand pump to turn on, exacerbating the leak. Further, integrated pressure switches use predefined pressure thresholds, which can be difficult to determine in different environments with different source pressures and flow rates. Therefore, there is a long-felt but unresolved need for systems and methods for detecting dispensing and leaks in beverage dispensing devices.

BRIEF SUMMARY OF THE DISCLOSURE

Briefly described, and according to one embodiment, aspects of the present disclosure generally relate to beverage dispensing device. The device can include a cabinet assembly and head unit. The cabinet assembly can include an inlet valve that can receive fluid from a fluid source (e.g., water source in a commercial or residential building). The inlet valve can be connected to a first fluid pathway (e.g., hose, tube, duct) that includes a filter, a first pressure sensor, and a buffer tank. The first fluid pathway can end at a backflow preventer. For example, the first fluid pathway can connect the outlet of the inlet valve to the inlet of the backflow preventer. The outlet of the backflow preventer can be connected to a demand pump by a second fluid pathway. The outlet of the demand pump can be connected to a second pressure sensor, a chiller, and dispensing valves in a head unit. The cabinet assembly can include a microcontroller unit ("MCU") that can receive pressure measurements from the first and second pressure sensor and control the functionality of the demand pump and the inlet valve.

The head unit can include dispensing valves and a dispensing nozzle. The dispensing valves can be controlled by a computing device in the head unit. The computing device in the head unit can receive inputs for dispensing a beverage via the dispensing nozzle. However, the computing device may not be connected to the MCU in the cabinet assembly, which can prevent communication between the computing device and the MCU. Thus, the MCU may not be able to receive the inputs from the computing device.

In response to receiving inputs for dispensing a beverage, the computing device can open the dispensing valves. Opening the dispensing valves can cause a drop in pressure along the third fluid pathway. The second pressure sensor can record the drop in pressure. For example, the second pressure sensor can record a 100 psi per second or greater drop in pressure, which can indicate that a beverage is being dispensed. In response, the MCU can turn on the demand pump, which can increase the flow of fluid through the dispensing valves, and open the inlet valve to allow fluid to flow into the cabinet assembly. In response to receiving inputs to stop dispensing a beverage, the computing device can close the dispensing valves. Closing the dispensing valves can cause an increase in pressure along the third fluid pathway. After the dispensing valves close, the fluid can flow back through the demand pump until reaching the backflow preventer. Due to the backflow preventer, the fluid cannot flow back to the first fluid pathway. The second pressure sensor can record the increase in pressure. For example, the second pressure sensor can record a 100 psi per second or greater increase in pressure, which can indicate that dispensing has ended. In response, the MCU can turn off the demand pump and close the inlet valve.

The MCU can monitor the first and second pressure sensors for any changes in the pressure along the first, second, or third fluid pathways. For example, if the first or second pressure sensors records a drop in pressure between approximately 3 psi per second and approximately 100 psi per second, the MCU can determine that a leak is present in the first, second, or third fluid pathways. For example, if the MCU detects a 50 psi per second drop in pressure at the second pressure sensor, the MCU can determine that a leak is present in the second or third fluid pathways. As another example, if the MCU detects a 50 psi per second drop in pressure at the first pressure sensor, the MCU can determine that a leak is present in the first fluid pathway. In response to detecting a leak, the MCU can perform a remedial action, including but not limited to, sending an alert to a user or technician, logging the leak, or disabling the beverage dispensing device.

The above and further features of the disclosed systems and methods will be recognized from the following detailed descriptions and drawings of various embodiments.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1A:
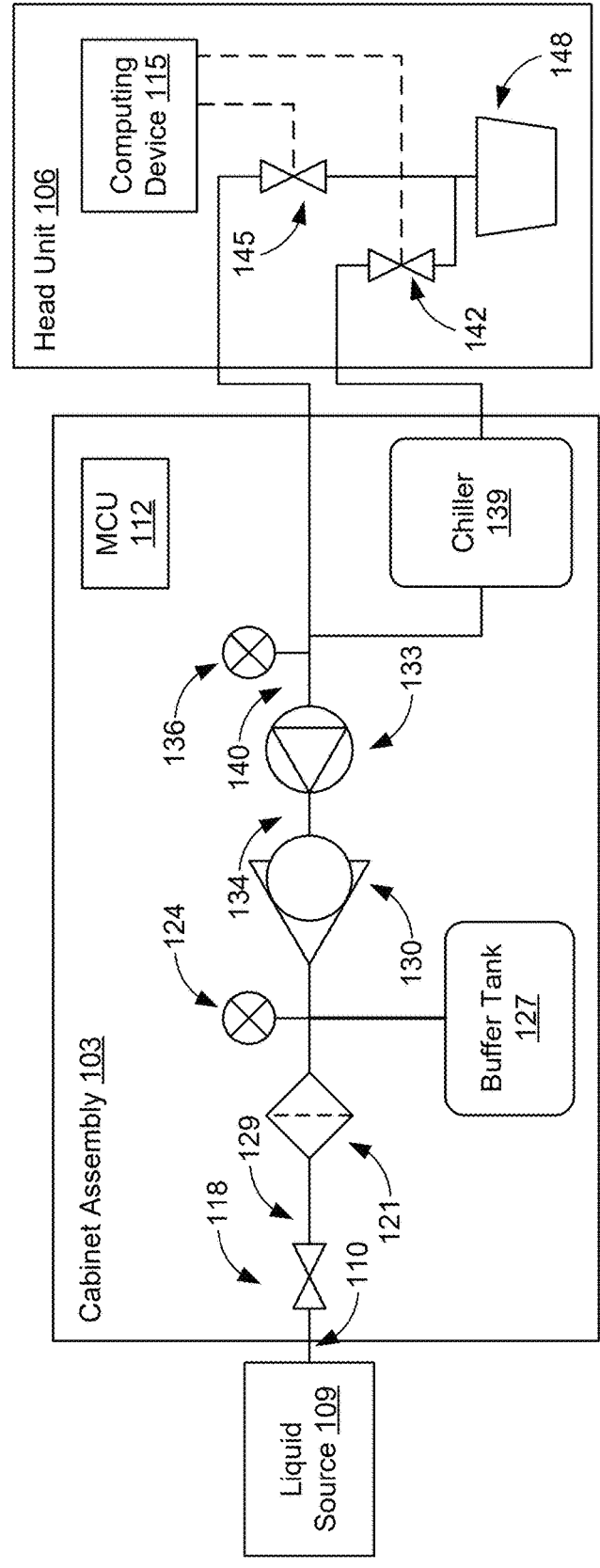
FIG. 1A illustrates an exemplary dispensing and leak detection system according to various embodiments of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

The terms "approximately" and "about" shall be interpreted to mean proximally close to the stated number, but perhaps not exact. For example, the terms "approximately" and "about" shall be interpreted to mean "reasonably close to" and include any statistically insignificant variations therefrom. In some embodiments, the terms "approximately" and "about" could be within a 5% threshold of the total value of the described amount.

Exemplary Embodiments

Referring now to the figures, for the purposes of example and explanation of the fundamental processes and components of the disclosed systems and processes, reference is made to FIG. 1A, which illustrates the dispensing and leak detection system 100 ("system 100"). As will be understood, the system 100 can be used in a beverage dispensing device. The system 100 can include a cabinet assembly 103 and a head unit 106. The cabinet assembly 103 and the head unit 106 can be configured to dispense a beverage for a user. The cabinet assembly 103 can be connected (e.g., coupled, in fluid connection) to a fluid source 109 via a fluid pathway 110 (e.g., a hose, tube, conduit, duct, any device capable of directing fluid). The fluid source 109 can include a water source from a commercial or residential building. The fluid from the fluid source 109 can be used to dispense a beverage for a user at the head unit 106.

The functionality of the cabinet assembly 103 can be controlled by a microcontroller unit 112 ("MCU 112"). The MCU 112 can include any microcontroller or other computing device capable of controlling one or more valves and/or pumps and receiving measurements from one or more sensors. The MCU 112 can include one or more special-purpose processing devices such as an application specific integrated circuit ('ASIC'), a field programmable gate array ('FPGA'), a digital signal processor ('DSP'), network processor, or other circuit. The functionality of the head unit 106 can be controlled by a computing device 115. The computing device 115 can include any computing device capable of receiving inputs from a user to dispense a beverage and controlling a dispensing mechanism (e.g., valves, dispensing nozzle). The computing device 115 can include any computing device, including a processor and memory, capable of accessing a network (e.g., Wi-Fi, wired network). In some embodiments, the computing device 115 can include a single board computer touchscreen. In some embodiments, the MCU 112 can be connected to the computing device 115 via a wired or wireless connection (e.g., USB, UART, Bluetooth). In other embodiments, the MCU 112 may not be connected to the computing device 115 and can lack the capability of communicating with or receiving data from the computing device 115. As will be understood by those having skill in the art, in these embodiments, the MCU 112 may omit a connection to the computing device 115 due to space, compatibility, or cost limitations.

The cabinet assembly 103 can include an inlet valve 118, a filter 121, a pressure sensor 124, and a buffer tank 127 connected via a fluid pathway 129 (e.g., a hose, tube, conduit, duct, any device capable of directing fluid). The fluid pathway 129 can connect the outlet of the inlet valve 118 to the inlet of a backflow preventer 130. The inlet valve 118 can be connected to the fluid pathway 110 to receive fluid into the cabinet assembly 103 from fluid source 109. The received fluid can include a liquid, such as potable water from a water supply service. The inlet valve 118 can include any type of valve for use in a fluid dispensing, including but not limited to, solenoid valves, gate valves, ball valves, butterfly valves, globe valves, and diaphragm valves. As will be understood, the functionality of the inlet valve 118 can be controlled by the MCU 112. For example, the MCU 112 can determine that a dispensing event has begun and open the inlet valve 118. Once the MCU 112 determines that the dispensing event has ended, the MCU 112 can close the inlet valve 118. After the fluid passes through the inlet valve 118, the fluid can pass through the filter 121. The fluid can include liquid, gas, and/or solids (e.g., dissolved solids). The filter 121 can include any filter capable of filtering the fluid, including but not limited to, an activated carbon filter, a reverse osmosis filter, an ultraviolet filter, an ion exchange filter, and an alkaline filter. The pressure sensor 124 can measure and monitor the fluid pressure in the fluid pathway 129. The pressure sensor 124 can include any type of pressure sensor capable of measuring the fluid pressure, including but not limited to, a piezoelectric pressure sensor, a capacitive pressure sensor, a silicon pressure sensor, a differential pressure sensor, and a smart pressure sensor. The fluid pathway 129 can be connected to the buffer tank 127. The buffer tank 127 can be used to relieve or maintain a predetermined fluid pressure in the fluid pathway 129. For example, if the pressure in the fluid pathway 129 is above a predetermined pressure, the buffer tank 127 can receive excess fluid to reduce the pressure in the fluid pathway 129. As will be understood by those having skill in the art, the filter 121, the pressure sensor 124, and buffer tank 127 can be organized in any order along the fluid pathway 129.

The cabinet assembly 103 can include the backflow preventer 130 connected to a demand pump 133 via a fluid pathway 134 (e.g., a hose, tube, conduit, duct, any device capable of holding, carrying, and/or directing fluid). The fluid pathway 134 can connect the outlet of the backflow preventer 130 to the inlet of the demand pump 133. The backflow preventer 130 can allow fluid to flow from the fluid pathway 129 to the fluid pathway 134. The backflow preventer 130 can prevent fluid from flowing from the fluid pathway 134 to the fluid pathway 129. For example, the backflow preventer 130 can prevent the fluid from flowing from the fluid pathway 134 to the fluid pathway 129 if the pressure in the fluid pathway 129 is lower than the pressure in the fluid pathway 134. In another example, the backflow preventer 130 can prevent the fluid from flowing from the fluid pathway 134 to the fluid pathway 129 regardless of the pressure in either the fluid pathway 129 or the fluid pathway 134. The backflow preventer 130 can include any type of backflow preventer, including but not limited to, an atmospheric vacuum breaker, a pressure vacuum breaker, and a double check valve assembly. The demand pump 133 can pump the fluid to the valves in the head unit 106 whenever a dispensing event begins (e.g., when a beverage is dispensed from the head unit 106). The demand pump 133 can include any type of pump capable of pumping the fluid, including but not limited to, a centrifugal pump, a diaphragm pump, a rotary lobe pump, a piston pump, and a peristaltic pump. As will be understood, the functionality of the demand pump 133 can be controlled by the MCU 112. For example, the MCU 112 can determine that a dispensing event has begun and turn on the demand pump 133. Once the MCU 112 determines that the dispensing event has ended, the MCU 112 can turn off the demand pump 133.

The cabinet assembly 103 can include a pressure sensor 136 and a chiller 139 connected to a fluid pathway 140 (e.g., a hose, tube, conduit, duct, any device capable of directing fluid). The fluid pathway 140 can connect the demand pump 133 outlet to the head unit 106. The pressure sensor 136 can measure and monitor the fluid pressure in the fluid pathway 140. The pressure sensor 136 can include any type of pressure sensor capable of measuring the fluid pressure, including but not limited to, a piezoelectric pressure sensor, a capacitive pressure sensor, a silicon pressure sensor, a differential pressure sensor, and a smart pressure sensor. The chiller 139 can be any chiller capable of decreasing the temperature of the fluid, including but not limited to, a thermoelectric chiller, a compressor chiller, and an ice bank chiller.

The head unit 106 can include a still valve 142, an ambient valve 145, and a dispensing nozzle 148. The still valve 142 can received chilled fluid from the chiller 139 via a fluid pathway. The ambient valve 145 can receive fluid from the fluid pathway 140. The still valve 142 and the ambient valve 145 can include any type of valve for use in a fluid dispensing, including but not limited to, solenoid valves, gate valves, ball valves, butterfly valves, globe valves, and diaphragm valves. The still valve 142 and the ambient valve 145 can be connected to the dispensing nozzle 148 via a fluid pathway. The still valve 142 and the ambient valve 145 can be controlled by the computing device 115.

To dispense a beverage, the computing device 115 can receive inputs from a user, which can begin a dispensing event. In response, the computing device 115 can cause the still valve 142 or the ambient valve 145 to open based on the received inputs and can begin dispensing the beverage via the dispensing nozzle 148. For example, the still valve 142 can open if the inputs included a request for chilled fluid and the ambient valve 145 can open if the inputs included a request for ambient temperature fluid. The MCU 112 can instruct the demand pump 133 to turn on to pump the fluid to the still valve 142 or the ambient valve 145 and instruct the inlet valve 118 to open to allow fluid to flow into the cabinet assembly 103 from the liquid source 109. However, when the computing device 115 is not in communication with the MCU 112, the MCU 112 may not receive an indication when the dispensing valve is opened, such as by receiving inputs or data related to the dispensing event or the state of the still valve 142 and/or the ambient valve 145. Instead of receiving the inputs or data related to the dispensing event or the state of the still valve 142 and/or the ambient valve 145, the MCU 112 can determine that a dispensing event has begun based on the measurements from the pressure sensors 124 and 136. For example, the MCU 112 can determine that a dispensing event has begun based on a drop in pressure measured by the pressure sensor 136 and instruct the demand pump 133 to turn on and the inlet valve 118 to open. As another example, the MCU 112 can determine that a dispensing event has ended (e.g., the user has provided inputs ending the dispensing event) based on an increase in pressure measured by the pressure sensor 136 and instruct the demand pump 133 to turn off and the inlet valve 118 to close. As will be understood and discussed further herein, the MCU 112 can determine the start and end of a dispensing event without receiving the inputs or data related to the dispensing event or the state of the still valve 142 and/or the ambient valve 145. The MCU 112 can determine the start and end of a dispensing event based on the measurements from the pressure sensors 124 and 136. In some embodiments, the MCU 112 can determine the start and end of a dispensing event based exclusively using data from the pressure sensors 124 and 136. The relationship between the dispensing event and the pressure measurements will be discussed further herein at FIGS. 3A and 3B.

The MCU 112 can determine if a leak is present in the fluid pathways 129, 134, and 140 based on the measurements from the pressure sensors 124 and 136. As will be understood, a leak can include any loss of fluid in the fluid pathway caused by a hole or puncture or a poor fit on any of the components in the cabinet assembly 103 or the head unit 106. For example, if either of the pressure sensors 124 or 136 measures a slow loss of pressure over time, the MCU 112 can determine that a leak is present in fluid pathways 129, 134, or 140. The relationship between leaks and the pressure measurements will be discussed further herein at FIGS. 3A and 3B.

Figure 1B:
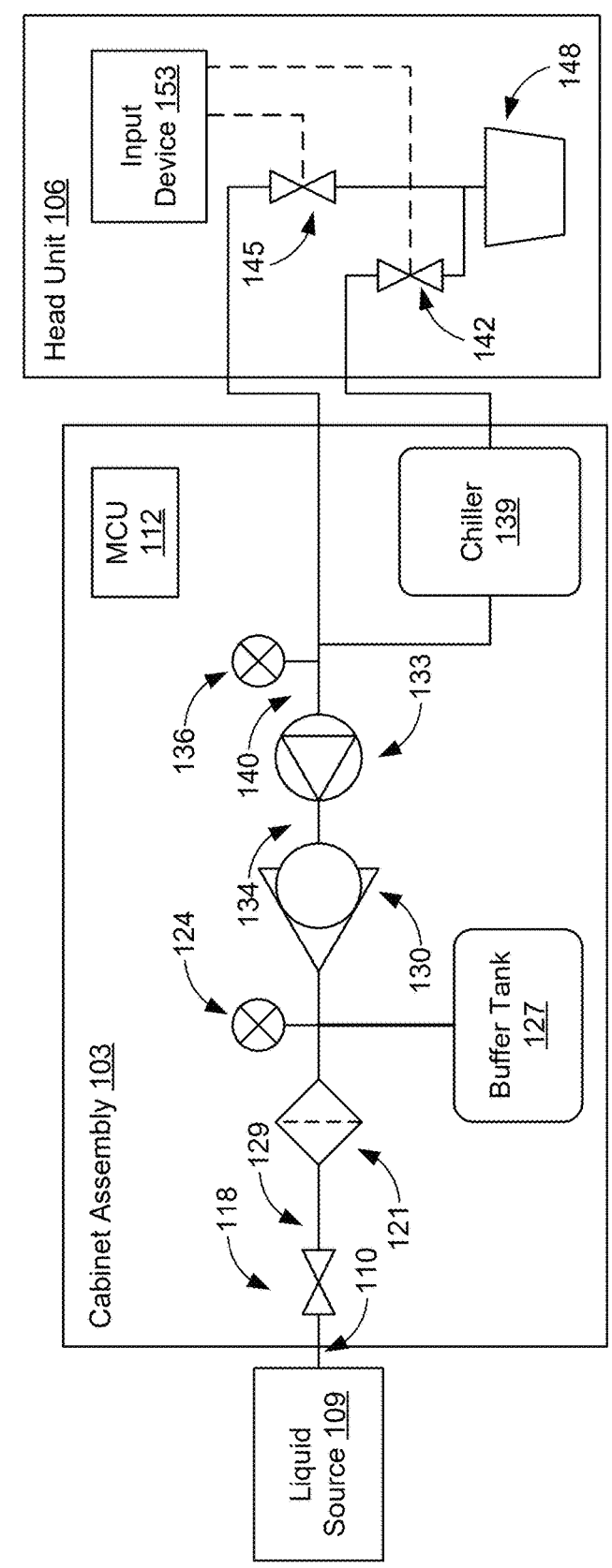
FIG. 1B illustrates an exemplary dispensing and leak detection system according to various embodiments of the present disclosure.

Referring now to FIG. 1B, shown is an exemplary dispensing and leak detection system 150 ("system 150"). As will be understood and appreciated, the system 150 can include the cabinet assembly 103, the head unit 106, the liquid source 109, the MCU 112, the inlet valve 118, the filter 121, the buffer tank 127, the backflow preventer 130, the demand pump 133, the chiller 139, the still valve 142, the ambient valve 145, the dispensing nozzle 148, the pressure sensors 124 and 136, and the fluid pathways 110, 129, 134, and 140, as described with reference to the system 100 illustrated by FIG. 1.

The system 150 can include an input device 153 in the head unit 106. The input device can include any input device capable of controlling the function of the still valve 142, the ambient valve 145, and the dispensing nozzle 148, including but not limited to a button or a capacitive touch interface. As will be understood, the input device 153 may not include a processor, memory, and/or display. In some embodiments, the MCU 112 may not be connected to the input device 153 and can lack the capability of communicating with or receiving signals from the input device 153. As will be understood by those having skill in the art, in these embodiments, the MCU 112 may omit a connection to the input device 153 due to space, compatibility, or cost limitations.

To dispense a beverage, the input device 153 can receive inputs from a user, which can begin a dispensing event. In response, the input device 153 can cause the still valve 142 or the ambient valve 145 to open based on the received inputs and can begin dispensing the beverage via the dispensing nozzle 148. The input device 153 can stop receiving inputs or receive an input ending the dispensing event, and in response, the input device 153 can cause the still valve 142 or the ambient valve 145 to close. When the input device 153 is not in communication with the MCU 112, the MCU 112 can determine that the dispensing event has began or ended based the measurements from the pressure sensors 124 and 136.

In some other embodiments, the head unit 106 can include a faucet as a dispensing mechanism. In some embodiments, the head unit 106 may not include the still valve 142 and/or the ambient valve 145. In this embodiment, the head unit 106 can include an input device configured to control the faucet. The faucet can be configured to dispense ambient temperature fluid or colder temperature fluid depending on the received inputs.

Figure 2:
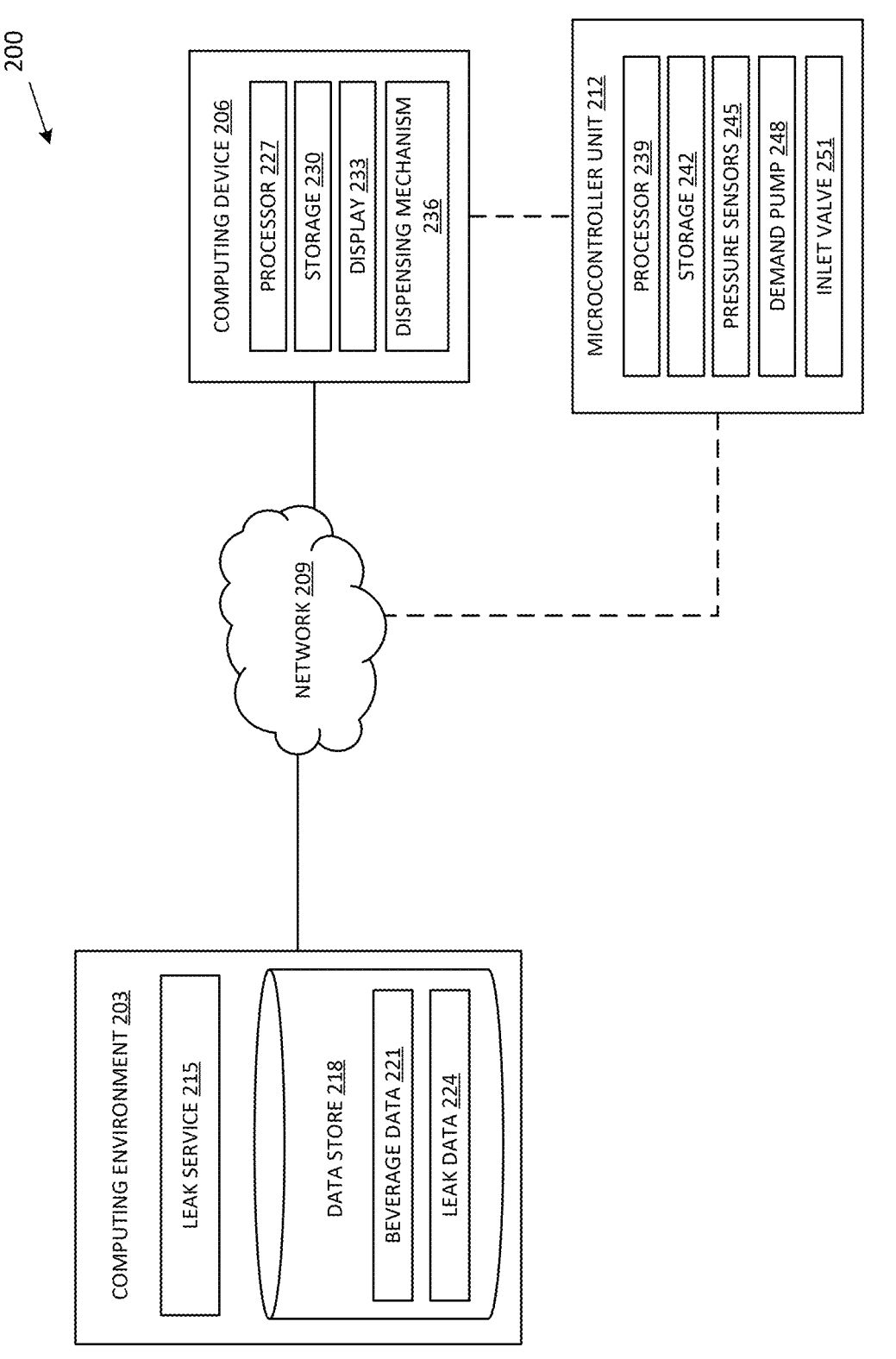
FIG. 2 illustrates an exemplary networked environment for the disclosed system according to various embodiments of the present disclosure.

Referring now to FIG. 2, shown is an exemplary networked environment 200 for the dispensing and leak detection system according to various embodiments of the present disclosure. As will be understood and appreciated, the exemplary networked environment 200 shown in FIG. 2 represents merely one approach or embodiment of the present system, and other aspects are used according to various embodiments of the present system. Exemplary networked environment 200 can include, but is not limited to, a computing environment 203 connected to one or more computing devices 206 over a network 209. The networked environment 200 can include a microcontroller unit 212 ("MCU 212"). In one embodiment, the MCU 212 can be an MCU 112 as described herein. In some embodiments, the MCU 212 can be connected to the computing device 206 via a wired or wireless connection (e.g., USB, UART, Bluetooth, any method of allowing the MCU 212 to communicate with the computing device 206). In some embodiments, the MCU 212 can be connected to the network 209. In other embodiments, the MCU 212 and the computing device 206 may not be connected and may be unable to communicate. As will be understood, the computing device 206 can include the computing device 115 in the head unit 106 and the MCU 212 can include the MCU 112 in the cabinet assembly 103.

The elements of the computing environment 203 can be provided via one or more computing devices that may be arranged, for example, in one or more server banks or computer banks or other arrangements. Such computing devices can be located in a single installation or may be distributed among many different geographical locations. For example, the computing environment 203 can include one or more computing devices that together may include a hosted computing resource, a grid computing resource, or any other distributed computing arrangement. In some cases, the computing environment 203 can correspond to an elastic computing resource where the allotted capacity of processing, network, storage, or other computing-related resources may vary over time. Regardless, the computing environment 203 can include one or more processors and memory having instructions stored thereon that, when executed by the one or more processors, cause the computing environment 203 to perform one, some, or all of the actions, methods, steps, or functionalities provided herein.

perform one, some, or all of the actions, methods, steps, or functionalities provided herein.

The computing environment 203 can include a leak service 215 and the data store 218. The leak service 215 can correspond to one or more software executables that can be executed by the computing environment 203 to perform the functionality described herein. Various data can be stored in the data store 218, including but not limited to, the beverage data 221 and the leak data 224. The leak service 215 can perform a remedial action based on the MCU 212 detecting a leak. For example, the leak service 215 can transmit an alert to a user or technician computing device via the network 209. As another example, the leak service 215 can log the leak, including the pressure change, the possible location of the leak, and the date and time that the leak was detected as the leak data 224. As another example, in response to detecting a leak, the MCU 212 can disable dispensing and the leak service 215 can transmit an alert that dispensing has been disabled. The MCU 212 can disable dispensing by disabling the demand pump 248 and inlet valve 251, such as by not sending a signal to turn on the demand pump 248 and turning off the demand pump 248 if it is on. As another example, the MCU 212 can disable dispensing by not sending a signal to open the inlet valve 251 or closing the inlet valve 251 if it is open.

The leak service 215 can apply a machine learning model to the dispensing event data (e.g., any data related to dispensing events, including but not limited to inputs, start time, end time) and the leak data 224. The leak service 215 can train the machine learning model to detect dispensing events and leaks. The dispensing event data, the leak data, and the trained model can be shared with other dispensing systems connected to the network 209. The machine learning algorithm or model can be any machine learning algorithm or model or combination thereof, including but not limited to nearest neighbor, support vector machines, gradient boosting, neural networks, logistic regression, linear regression, decision trees, random forest, Naive Bayes, k-means clustering, time series regression, pointwise prediction, stepwise regression, Gaussian models, hidden Markov models, ensemble learning models, means-shift clustering, and Bayesian models.

According to various embodiments, the computing device 206 can include any device capable of accessing network 209 including, but not limited to, a computer, smartphone, tablets, or other device. In some embodiments, the computing device 206 can include a single board computer touchscreen. The computing device 206 can include a processor 227 and storage 230. The computing device 206 can include a display 233 on which various user interfaces can be rendered to allow users to configure, monitor, control, and command various functions of networked environment 200, including a dispensing mechanism 236. The dispensing mechanism 236 can include one or more valves and a beverage dispensing nozzle. As will be understood, the dispensing mechanism 236 can include the still valve 142, the ambient valve 145, and the nozzle 148. In various embodiments, computing device 206 can include multiple computing devices. Regardless, the computing device 206 can include one or more processors and memory having instructions stored thereon that, when executed by the one or more processors, cause the computing device 206 to perform one, some, or all of the actions, methods, steps, or functionalities provided herein.

The network 209 includes, for example, the Internet, intranets, extranets, wide area networks (WANs), local area networks (LANs), wired networks, wireless networks, or other suitable networks, etc., or any combination of two or more such networks.

The MCU 212 can include a processor 239 and storage 242. The MCU 212 can receive measurements from pressure sensors 245. As will be understood, the pressure sensors 245 can include the pressure sensors 124 and 136. Based on the measurements from the pressure sensors 245, the MCU 212 can control the demand pump 248 and inlet valve 251. For example, the MCU 212 can turn the demand pump 248 on and off based on the measurements from the pressure sensors 245. As another example, the MCU 212 can open and close the inlet valve 251 based on the pressure sensors 245. As will be understood, the demand pump 248 can include the demand pump 133 and the inlet valve 251 can include the inlet valve 118.

Figure 3A:
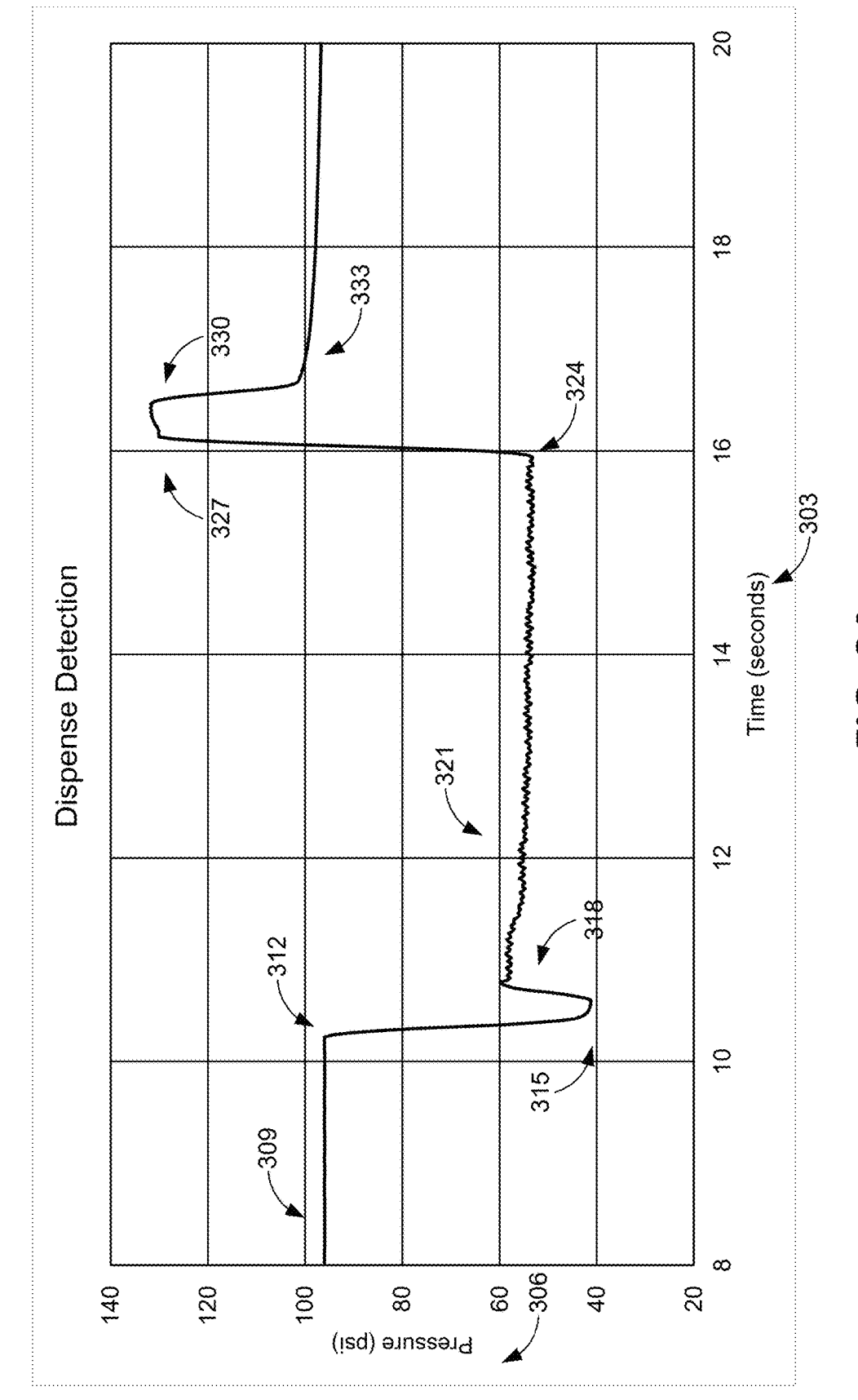
FIG. 3A illustrates an exemplary pressure and time graph according to various embodiments of the present disclosure.

Referring now to FIG. 3A, shown is an exemplary pressure and time graph 300 ("graph 300") according to various embodiments of the present disclosure. As will be understood, the graph 300 is an exemplary, non-limiting example of pressure changes over time and other embodiments may include different pressure measurements over time. The pressure measurements and the times described herein are merely exemplary and non-limiting. The graph 300 can include a horizontal axis 303 for time shown in seconds and a vertical axis 306 for pressure shown in pounds per square inch (psi). The graph 300 can illustrate the pressure measurement at a particular point in time. As will be understood, the pressure measurements can be determined by the pressure sensors 124 and 136 illustrated by FIG. 1 or the pressure sensors 245 illustrated by FIG. 2. The graph 300 can illustrate the pressure measurements as a dispensing event starts and as the dispensing event ends. The dispensing event can start when a user provides input requesting that a beverage be dispensed from the head unit. The dispensing event can end when a user provides input requesting that dispensing stops.

The graph 300 can include exemplary events 309, 312, 315, 318, 321, 324, 327, and 330. Each event can include a pressure measurement and a time. As will be understood, the events 309, 312, 315, 318, 321, 324, 327, and 330 can be sequential. The event 309 can include a constant (e.g., consistent, stable) pressure measurement over time. For example, the event 309 can be illustrated by a horizontal line on the graph 300 representing the constant pressure measurement over a period of time. The constant pressure measurement can indicate that the dispensing event has not begun. While the event 309 shows an approximate pressure of 95 psi over approximately 2 seconds, the event 309 can include any constant pressure measurement over any amount of time. For example, the initial pressure measurement from event 309 can be approximately equivalent to the last pressure measurement from event 309. The pressure measurement at event 309 can be used as a threshold pressure against which any changes in pressure are compared against.

The event 312 can include a sharp drop in the pressure measurement. For example, the event 312 can include a decrease in pressure of more than 100 psi per second. The event 312 can be illustrated by a nearly vertical line on the graph 300 representing the drop in pressure. For example, the initial pressure measurement from event 312 can be greater than the last pressure measurement from event 312. The event 312 can indicate that a user has provided inputs starting the dispensing event. In response to the user providing inputs to start the dispensing event, the dispensing valves in the head unit (e.g., the still valve 142, the ambient valve 145, the dispensing mechanism 236) can open, which can cause the sharp drop in pressure.

The event 315 can include the pressure measurement falling below a predefined threshold. For example, the predefined threshold can include a predefined pressure measurement or a predefined rate of decrease in the pressure measurement (e.g., more than or equal to 100 psi per second). In response to the pressure measurement falling below a predefined threshold, the MCU (e.g., MCU 112, MCU 212) in the cabinet assembly can turn on the demand pump (e.g., demand pump 133, demand pump 248) and open the inlet valve (e.g., inlet valve 118, inlet valve 251).

The event 318 can include an increase in the pressure measurement. For example, the event 318 can include a pressure increase of approximately 20 psi in less than half a second. As another example, the initial pressure measurement from event 318 can include a lower pressure measurement than the last pressure measurement from event 318. The event 318 can be illustrated by a vertical line on the graph 300 representing the increase in pressure. The increase in pressure can be caused by the demand pump turning on. For example, turning on the demand pump can increase the pressure measurement and flow rate of the fluid so that a sufficient rate of fluid is dispensed at the dispensing nozzle (e.g., nozzle 148, dispensing mechanism 236).

The event 321 can include a constant (e.g., consistent, average) pressure measurement over time. For example, the event 321 can include an average pressure measurement of approximately 55 psi over 4.5 seconds. In some embodiments, the initial pressure measurement of event 321 can be within 10 psi of the final pressure measurement of event 321. In some other embodiments, the initial pressure measurement of event 321 can be more than 10 psi greater than the final pressure measurement of event 321. However, compared to the event 309, the event 321 can include small variations in the pressure measurements (e.g., a rate of change of approximately 5 psi in less than half a second), which can be illustrated by a zig-zag line or a pressure ripple on the graph 300. The small variations in the pressure measurements in event 321 can be caused by the operation of the demand pump. Further, the average pressure measurement of event 321 can be lower than the average pressure measurement of event 309, which can indicate that the dispensing event is ongoing.

The event 324 can include a sharp increase in the pressure measurement. For example, the event 324 can include an increase in pressure of more than 100 psi per second. The event 324 can be illustrated by a nearly vertical line of the graph 300 representing the increase in pressure. For example, the initial pressure measurement from the event 324 can be lower than the last pressure measurement from event 324. The event 324 can indicate that a user has provided inputs ending the dispensing event. In response to the user providing inputs to end the dispensing event, the dispensing valves in the head unit can close, which can cause the sharp increase in pressure.

The event 327 can include the pressure measurement exceeding a predefined threshold. For example, the predefined threshold can include a predefined pressure measurement or a predefined rate of increase in the pressure measurement (e.g., more than or equal to 100 psi per second). In response to the pressure measurement exceeding a predefined threshold, the MCU in the cabinet assembly can turn off the demand pump and close the inlet valve.

The event 330 can include a decrease in the pressure measurement. For example, the event 324 can include a pressure decrease of approximately 30 psi in less than 2 seconds. As another example, the initial pressure measurement from the event 330 can include a higher pressure measurement than the last pressure measurement from the event 330. The event 330 can be illustrated by a vertical line on the graph 300 representing the decrease in pressure. The decrease can be caused by the demand pump turning off. For example, turning off the demand pump can cause the fluid to flow away from the dispensing valves, through the demand pump, until the fluid reaches the backflow preventer (e.g., backflow preventer 130).

The event 333 can include a constant pressure or a slowly decreasing pressure over time. For example, the event 333 can include a constant pressure of approximately 95 psi over approximately 3 seconds. As another example, the event 333 can include a decreasing pressure measurement of less than or equal to approximately 3 psi per second. As another example, initial pressure measurement of the event 333 can be within 10 psi of the final pressure measurement of the event 333. The constant pressure or slowly decreasing pressure of the event 333 can be caused by the pressure of the fluid equalizing in the fluid pathways (e.g., fluid pathways 134 and 140). As another example, the last pressure measurement of the event 333 can be approximately equal to the initial pressure measurement of the event 309.

Figure 3B:
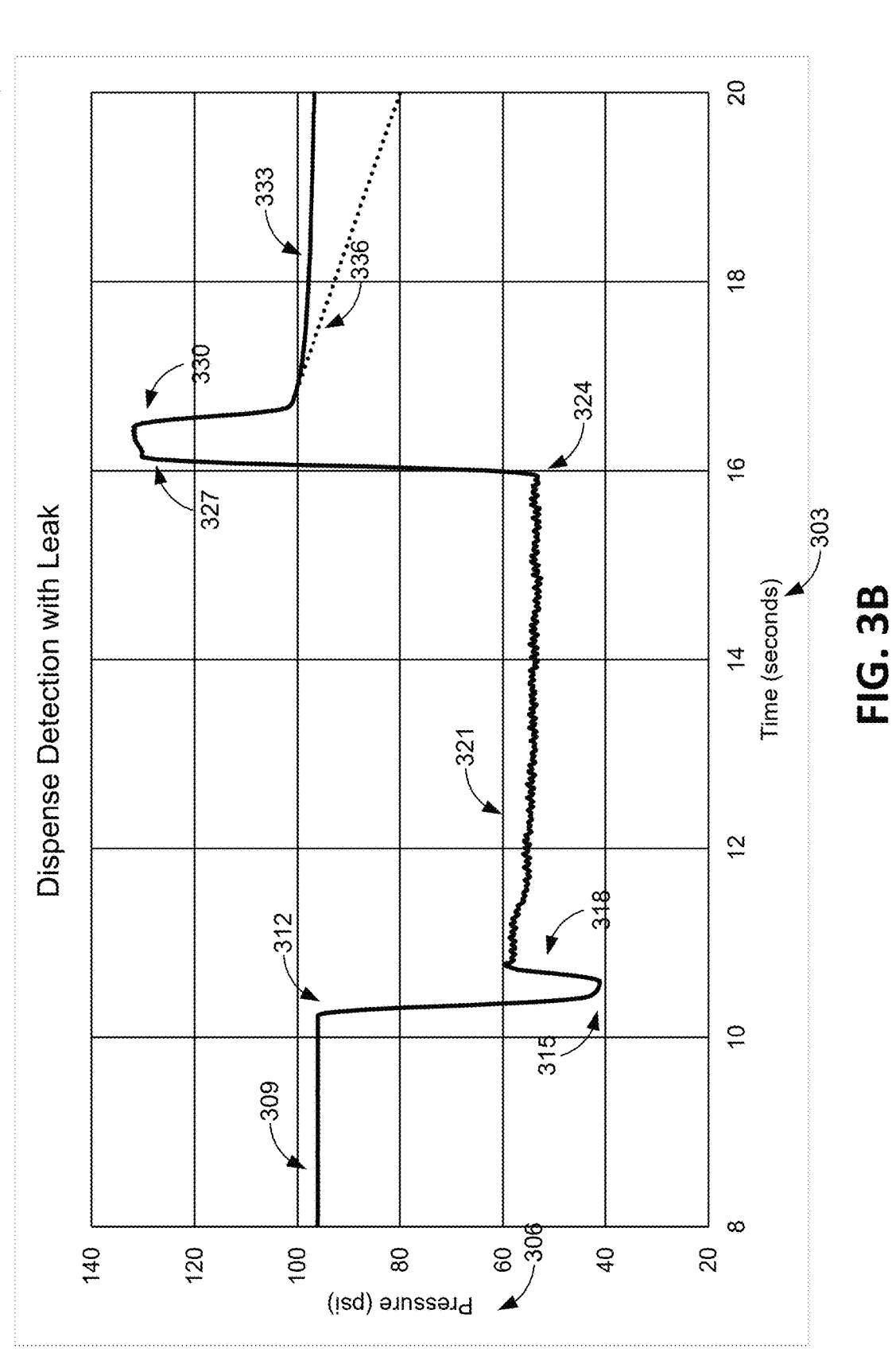
FIG. 3B illustrates an exemplary pressure and time graph according to various embodiments of the present disclosure.

Referring now to FIG. 3B, shown is the exemplary pressure and time graph 300 according to various embodiments of the present disclosure. The graph 300 illustrated by the FIG. 3B can illustrate a leak shown at event 336. The event 336 can be illustrated by a dashed line. The event 336 can include a decreasing pressure over time. For example, the event 336 can include a decrease in pressure of more than approximately 3 psi per second and less than approximately 100 psi per second. A decreasing rate of pressure between approximately 3 psi per second and 100 psi per second can indicate a leak in the fluid pathways (e.g., fluid pathways 129, 134 or 140).

Figure 4:
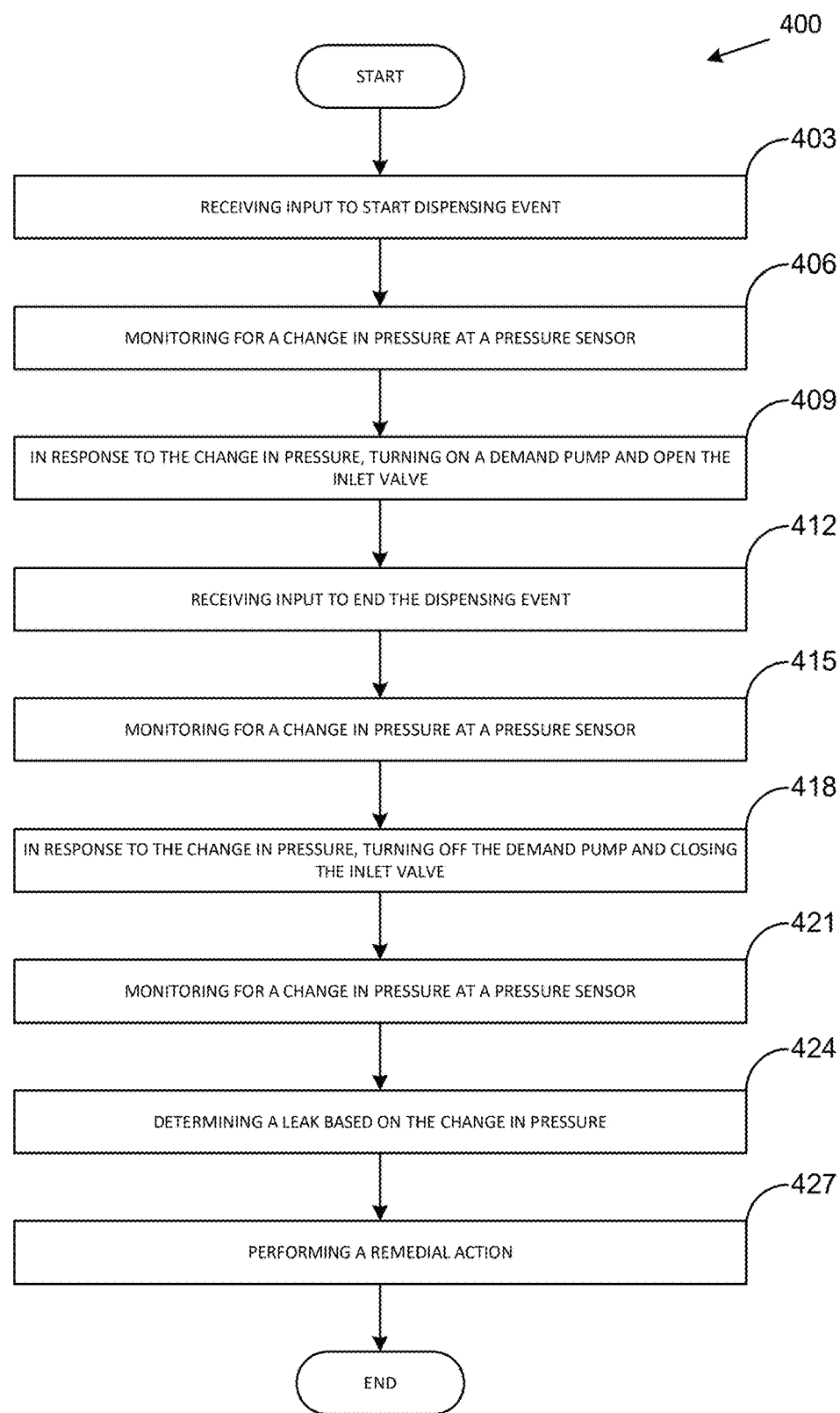
FIG. 4 illustrates an exemplary for detecting a dispensing event and a leak in a fluid pathway according to various embodiments of the present disclosure.

Referring now to FIG. 4, shown is an exemplary, high-level overview process 400 for detecting a dispensing event and a leak in a fluid pathway according to various embodiments of the present disclosure. As will be understood by one having ordinary skill in the art, the steps and processes shown in FIGS. 4 and 5 may operate concurrently and continuously, are generally asynchronous and independent, can be performed in part or in whole by a combination of one or more of the cabinet assembly 103, including the MCU 112, the inlet valve 118, the pressure sensors 124 and 136, and the demand pump 133, and the head unit 106, including the computing device 115, the still valve 142, the ambient valve 145, and the dispensing nozzle 148 and/or the computing device 206, the MCU 212, and the leak service 215 and are not necessarily performed in the order shown and various steps can be executed linearly or in parallel. Process 400 can be performed entirely, partially, or in coordination with the cabinet assembly 103, including the MCU 112, the inlet valve 118, the pressure sensors 124 and 136, and the demand pump 133, and the head unit 106, including the computing device 115, the still valve 142, the ambient valve 145, and the dispensing nozzle 148 and/or the computing device 206, the MCU 212, and the leak service 215.

At step 403, the process 400 can include receiving input to start the dispensing event. The computing device 115 (e.g., the computing device 206) can receive the inputs to start the dispensing event. Receiving the inputs can include receiving a request from a user to dispense a beverage. The inputs can include data related to the request beverage (e.g., flavor, volume, temperature). For example, the computing device 115 can receive the inputs via a display. As another example, the computing device 115 can pair to a mobile computing device via wireless pairing (e.g., Bluetooth, near field communications) and receive the inputs from the mobile computing device. Receiving the inputs can start the dispensing event. In response to receiving the inputs, the computing device 115 can cause the still valve 142 or the ambient valve 145 to open and begin dispensing the fluid via the dispensing nozzle 148. In response to the still valve 142 or the ambient valve 145 being opened, the pressure in the fluid pathways 134 and 140 can drop or decrease.

At step 406, the process 400 can include monitoring for a change in pressure at a pressure sensor. The MCU 112 (e.g., MCU 212) can monitor for a change in pressure at a pressure sensors 124 or 136 (e.g., pressure sensors 245). As previously discussed, the MCU 112 may not be in communication with the computing device 115 and may not receive the inputs to begin the dispensing event. Instead, the MCU 112 can determine that the dispensing event has begun by monitoring for a change in pressure at a pressure sensors 124 or 136. The MCU 112 can determine that the dispensing event has begun by detecting a drop or decrease in pressure at the pressure sensor 136. For example, the drop or decrease in pressure can be greater than 100 psi per second. A drop or decrease in pressure of greater than 100 psi per second can indicate that a dispensing event has begun. As will be understood, the cabinet assembly 103 can be calibrated such that any drop or decrease in pressure can indicate that the dispensing event has begun (e.g., greater than 50 psi per second, greater than 100 psi per second, greater than 200 psi per second). As another example, the drop or decrease in pressure can fall below a predefined pressure threshold, which can indicate that a dispensing event has begun. As another example, the drop or decrease in pressure can be less than 3 psi per second, which can indicate that the dispensing event has not yet begun. In response to detecting a drop or decrease in pressure greater than 100 psi per second at the pressure sensor 136, the MCU 112 can determine that the dispensing event has started and that the still valve 142 and/or the ambient valve 145 are open. The start time of the fluid dispensing event can include the time that the computing device 115 received the inputs or the time that the MCU 112 detected the drop or decrease in pressure.

The MCU 112 can detect a drop or decrease in pressure at the pressure sensor 124 or 136. As another example, if the drop or decrease in pressure is between approximately 3 psi per second and approximately 100 psi per second at either the pressure sensor 124 or 136, the drop or decrease in pressure can indicate a leak in the fluid pathway 129, 134, or 140.

At step 409, the process 400 can include turning on the demand pump and opening the inlet valve in response to the change in pressure. The MCU 112 can turn on the demand pump 133 (e.g., demand pump 248) and open the inlet valve 118 (e.g., inlet valve 251) based on detecting a drop or decrease in pressure of greater than 100 psi per second at the pressure sensor 136 or the pressure measurement at the pressure sensor 136 falling below a predefined threshold. Opening the inlet valve 118 can cause the pressure to increase in the fluid pathways 129 and 134. Turning on the demand pump 133 can cause the pressure to increase in the fluid pathway 140. Turning on the demand pump 133 can increase the flow of fluid out of the still valve 142 and the ambient valve 145 such that a sufficient amount of fluid is dispensed by the nozzle 148.

At step 412, the process 400 can include receiving input to end the dispensing event. The computing device 115 (e.g., the computing device 206) can receive the inputs to end the dispensing event. Receiving the inputs can include receiving a request from a user to stop dispensing a beverage. Receiving the inputs can stop the dispensing event. In response to receiving the inputs, the computing device 115 can cause the still valve 142 or the ambient valve 145 to close and stop dispensing the fluid via the dispensing nozzle 148. In response to the still valve 142 or the ambient valve 145 being closed, the pressure in the fluid pathways 134 and 140 can raise or increase.

At step 415, the process 400 can include monitoring for a change in pressure at a pressure sensor. The MCU 112 (e.g., MCU 212) can monitor for a change in pressure at a pressure sensors 124 or 136 (e.g., pressure sensors 245). The MCU 112 can determine that the dispensing event has ended by detecting a raise or increase in pressure at the pressure sensor 136. For example, the raise or increase in pressure can be greater than 100 psi per second. A raise or increase in pressure of greater than 100 psi per second can indicate that a dispensing event has ended. As will be understood, the cabinet assembly 103 can be calibrated such that any raise or increase in pressure can indicate that the dispensing event has ended (e.g., greater than 50 psi per second, greater than 100 psi per second, greater than 200 psi per second). As another example, the raise or increase in pressure can exceed a predefined pressure threshold, which can indicate that a dispensing event has ended. In response to detecting a raise or increase in pressure greater than 100 psi per second at the pressure sensor 136, the MCU 112 can determine that the dispensing event has ended and that the still valve 142 and the ambient valve 145 are closed. The end time of the fluid dispensing event can include the time that the computing device 115 received the inputs or the time that the MCU 112 detected the raise or increase in pressure.

At step 418, the process 400 can include turning off the demand pump and closing the inlet valve in response to the change in pressure. The MCU 112 can turn off the demand pump 133 and close the inlet valve 118 based on detecting a raise or increase in pressure of greater than 100 psi per second at the pressure sensor 136 or the pressure measurement at the pressure sensor 136 exceeding a predefined threshold. In response to turning off the demand pump 133, the fluid flows back from the still valve 142 and the ambient valve 145, through the demand pump 133, until the fluid reaches the backflow preventer 130. In some embodiments, the pressure in the fluid pathways 134 and 140 can be equal or approximately equal (e.g., within 10 psi). In other embodiments, the pressure in fluid pathway 140 can be higher than the pressure in the fluid pathway 134 (e.g., higher than 10 psi difference). In response to closing the inlet valve 118, the pressure in the fluid pathway 129 can decrease or remain constant.

At step 421, the process 400 can include monitoring for a change in pressure at a pressure sensor. The MCU 112 can monitor for a change in pressure at a pressure sensors 124 or 136. For example, the MCU 112 can monitor for a drop or decrease in pressure at a pressure sensors 124 or 136, which can indicate a leak in the fluid pathways 129, 134, or 140. As another example, if a leak was not detected prior to the dispensing event, a drop or decrease in pressure at a pressure sensor 136 can indicate a leak in either the still valve 142 or the ambient valve 145. The MCU 112 can determine if the leak is present in either the still valve 142 or the ambient valve 145 depending on which valve opened for the dispensing event. After a predefined duration of time after the end of the fluid dispensing event (e.g., less than 1 second, less than 2 seconds, less than 3 seconds), the MCU 112 can determine an initial pressure measurement at both pressure sensors 124 and 136. In some embodiments, the pressure in the fluid pathway 129 will be lower than the pressure in either the fluid pathway 134 or 140. After determining the initial pressure measurements, the MCU 112 will monitor the pressure measurements at both pressure sensors 124 and 136. If the MCU 112 determines that either pressure sensor 124 or 136 records a decrease or drop in pressure from the initial pressure measurement, the MCU 112 can determine that a leak is present in fluid pathways 129, 134, or 140, the still valve 142, or the ambient valve 145. In some embodiments, the MCU 112 can determine that a leak is present if the decrease or drop in pressure is between approximately 3 psi per second and approximately 100 psi per second. For example, if the MCU 112 determines that pressure sensor 136 records a pressure measurement lower than the initial pressure measurement from the pressure sensor 136, the MCU 112 can determine that there is a leak in either the fluid pathway 134 or 140. As another example, if the MCU 112 determines that pressure sensor 124 records a pressure measurement lower than the initial pressure measurement from the pressure sensor 124, the MCU 112 can determine that there is a leak in fluid pathway 129. As another example, if the MCU 112 determines that pressure sensor 124 records a pressure measurement lower than the initial pressure measurement from the pressure sensor 124 and that pressure sensor 136 records a pressure measurement lower than the initial pressure measurement from the pressure sensor 136, the MCU 112 can determine the decrease in pressure at both the pressure sensor 124 and the pressure sensor 136 are within a predefined percentage (e.g., 1%, 5%). In response, the MCU 112 can determine that there is a leak in either the fluid pathway 134 or 140. As another example, if the MCU 112 determines that pressure sensor 136 records a pressure measurement lower than the initial pressure measurement from the pressure sensor 136 and the decrease in pressure at the pressure sensor 136 is greater than a decrease in pressure or a pressure measurement at the pressure sensor 124, the MCU 112 can determine that there is a leak in either the fluid pathway 134 or 140. As another example, if the MCU 112 determines that pressure sensor 136 records a pressure measurement lower than the initial pressure measurement from the pressure sensor 136 and the decrease in pressure at the pressure sensor 136 is above a pressure measurement at the pressure sensor 124, the MCU 112 can determine that there is a leak in either the fluid pathway 134 or 140.

At step 424, the process 400 can include determining a leak based on the change in pressure. The MCU 112 can determine a leak based on the change in pressure at the pressure sensors 124 or 136, or at the still valve 142 or the ambient valve 145 if a leak was not detected prior to the dispensing event. For example, if the MCU 112 determines a decrease in pressure at the pressure sensor 136, the MCU 112 can determine that there is a leak in either the fluid pathway 134 or 140. As another example, if the MCU 112 determines a decrease in pressure at the pressure sensor 124, the MCU 112 can determine that there is a leak in the fluid pathway 129. In some embodiments, the MCU 112 can determine the severity of the leak based on the decrease in pressure. For example, a drop in pressure of approximately 3 psi per second can indicate that the leak is not as severe compared to a drop in pressure of approximately 100 psi per second, which could indicate a catastrophic leak that could damage or disable the cabinet assembly 103. As another example, if a leak was not detected prior to the dispensing event, the MCU 112 can determine a leak at the still valve 142 or the ambient valve 145 based on the change in pressure at the pressure sensor 136.

At step 427, the process 400 can include performing a remedial action. The MCU 112 (e.g., MCU 212) or the leak service 215 can perform the remedial action. For example, the MCU 112 can log the leak in the storage 242. If the MCU 112 is able to communicate with the computing device 115 (e.g., the computing device 206), the MCU 112 can transmit a message to the computing device 115 indicating that a leak is present in the fluid pathways 129, 134, or 140. In response, the computing device 115 can display a message on the display. For example, if the MCU 112 has network capabilities, the MCU 112 can transmit a message to the leak service 215 indicating that a leak is present in the fluid pathways 129, 134, or 140. In response, the leak service 215 can log the leak as the leak data 224. In some embodiments, the leak service 215 can transmit a message or alert to a user or technician via the network 209. In some embodiments, the MCU 112 can disable dispensing by disabling the demand pump 133 or by closing the inlet valve 118.

Figure 5:
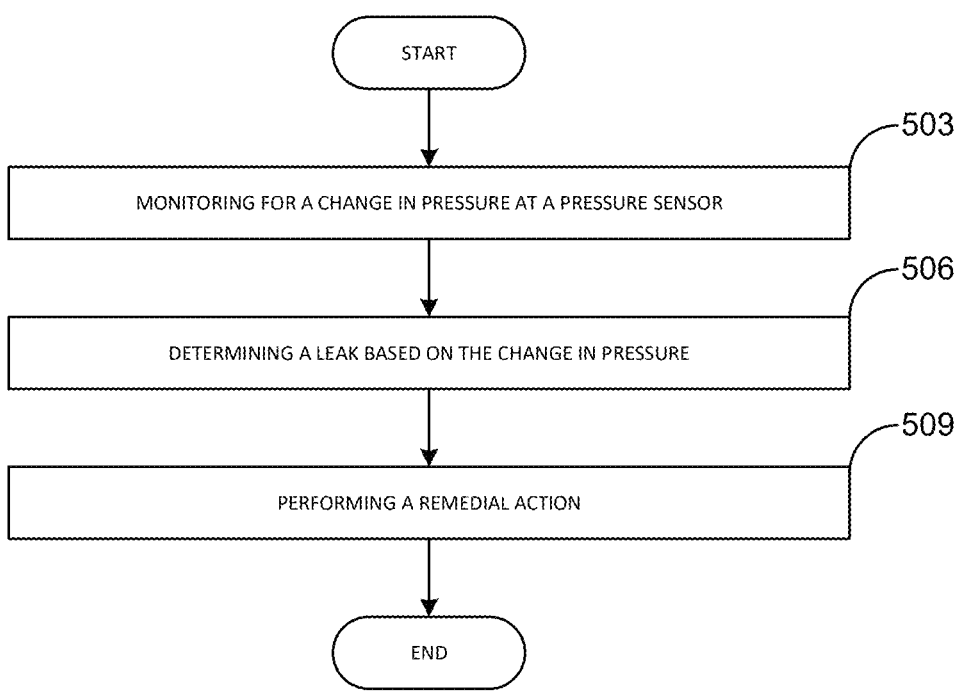
FIG. 5 illustrates an exemplary process for detecting a leak in a fluid pathway during an idle state according to various embodiments of the present disclosure.

Referring now to FIG. 5, shown is an exemplary, high-level overview process 500 for detecting a leak in a fluid pathway during an idle state according to various embodiments of the present disclosure. Process 500 can be performed entirely, partially, or in coordination with the cabinet assembly 103, including the MCU 112, the inlet valve 118, the pressure sensors 124 and 136, and the demand pump 133, and the head unit 106, including the computing device 115, the still valve 142, the ambient valve 145, and the dispensing nozzle 148 and/or the computing device 206, the MCU 212, and the leak service 215.

At step 503, the process 500 can include monitoring for a change in pressure at a pressure sensor. The MCU 112 can monitor for a change in pressure at a pressure sensors 124 or 136. For example, the MCU 112 can monitor for a drop or decrease in pressure at a pressure sensors 124 or 136, which can indicate a leak in the fluid pathways 129, 134, or 140. The MCU 112 can determine an initial pressure measurement at both pressure sensors 124 and 136. In some embodiments, the pressure in the fluid pathway 129 will be lower than the pressure in either the fluid pathway 134 or 140. After determining the initial pressure measurements, the MCU 112 will monitor the pressure measurements at both pressure sensors 124 and 136. If the MCU 112 determines that either pressure sensor 124 or 136 records a decrease or drop in pressure from the initial pressure measurement, the MCU 112 can determine that a leak is present in fluid pathways 129, 134, or 140. In some embodiments, the MCU 112 can determine that a leak is present if the decrease or drop in pressure is between approximately 0.2 psi per second and approximately 100 psi per second. For example, if the MCU 112 determines that pressure sensor 136 records a pressure measurement lower than the initial pressure measurement from the pressure sensor 136, the MCU 112 can determine that there is a leak in either the fluid pathway 134 or 140. As another example, if the MCU 112 determines that pressure sensor 124 records a pressure measurement lower than the initial pressure measurement from the pressure sensor 124, the MCU 112 can determine that there is a leak in fluid pathway 129. As another example, if the MCU 112 determines that pressure sensor 124 records a pressure measurement lower than the initial pressure measurement from the pressure sensor 124 and that pressure sensor 136 records a pressure measurement lower than the initial pressure measurement from the pressure sensor 136, the MCU 112 can determine the decrease in pressure at both the pressure sensor 124 and the pressure sensor 136 are within a predefined percentage (e.g., 1%, 5%). In response, the MCU 112 can determine that there is a leak in either the fluid pathway 134 or 140. As another example, if the MCU 112 determines that pressure sensor 136 records a pressure measurement lower than the initial pressure measurement from the pressure sensor 136 and the decrease in pressure at the pressure sensor 136 is greater than a decrease in pressure or a pressure measurement at the pressure sensor 124, the MCU 112 can determine that there is a leak in either the fluid pathway 134 or 140. As another example, if the MCU 112 determines that pressure sensor 136 records a pressure measurement lower than the initial pressure measurement from the pressure sensor 136 and the decrease in pressure at the pressure sensor 136 is above a pressure measurement at the pressure sensor 124, the MCU 112 can determine that there is a leak in either the fluid pathway 134 or 140.

At step 506, the process 500 can include determining a leak based on the change in pressure. The MCU 112 can determine a leak based on the change in pressure at the pressure sensors 124 or 136. For example, if the MCU 112 determines a decrease in pressure at the pressure sensor 136, the MCU 112 can determine that there is a leak in either the fluid pathway 134 or 140. As another example, if the MCU 112 determines a decrease in pressure at the pressure sensor 124, the MCU 112 can determine that there is a leak in the fluid pathway 129. In some embodiments, the MCU 112 can determine the severity of the leak based on the decrease in pressure. For example, a drop in pressure of approximately 0.2 psi per second can indicate that the leak is not as severe compared to a drop in pressure of approximately 100 psi per second, which could indicate a catastrophic leak that could damage or disable the cabinet assembly 103.

At step 509, the process 500 can include performing a remedial action. The MCU 112 (e.g., MCU 212) or the leak service 215 can perform the remedial action. For example, the MCU 112 can log the leak in the storage 242. If the MCU 112 is able to communicate with the computing device 115 (e.g., the computing device 206), the MCU 112 can transmit a message to the computing device 115 indicating that a leak is present in the fluid pathways 129, 134, or 140. In response, the computing device 115 can display a message on the display. For example, if the MCU 112 has network capabilities, the MCU 112 can transmit a message to the leak service 215 indicating that a leak is present in the fluid pathways 129, 134, or 140. In response, the leak service 215 can log the leak as the leak data 224. In some embodiments, the leak service 215 can transmit a message or alert to a user or technician via the network 209. In some embodiments, the MCU 112 can disable dispensing by disabling the demand pump 133 or by closing the inlet valve 118.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to.

The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed devices and methods for using the same will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the devices and methods for using the same to the precise forms disclosed. Many modifications and variations are possible in light of the above teaching.

The embodiments were chosen and described in order to explain the principles of the devices and methods for using the same and their practical application so as to enable others skilled in the art to utilize the devices and methods for using the same and various embodiments and with various modifications as are suited to the particular use contemplated. Alternative embodiments will become apparent to those skilled in the art to which the present devices and methods for using the same pertain without departing from their spirit and scope. Accordingly, the scope of the present devices and methods for using the same is defined by the appended claims rather than the foregoing description and the exemplary embodiments described therein. While thresholds are discussed herein as being met when the threshold is exceeded, the system may determine a threshold is met when a value meets or exceeds the threshold.

Clause 1. A system, comprising: an inlet valve; a backflow preventer; a demand pump; a first pressure sensor coupled to at least one computing device, wherein the first pressure sensor is configured to measure pressure between the backflow preventer and the inlet valve; a second pressure sensor coupled to the at least one computing device, wherein the second pressure sensor is configured to measure pressure between the demand pump and at least one dispensing valves; and the at least one computing device is configured to: detect completion of a fluid dispensing event based on a pressure measurement from the second pressure sensor; after a predefined duration from completion of the fluid dispensing event, determine a first pressure measurement at the first pressure sensor and a second pressure measurement at the second pressure sensor; and determine a leak in a fluid pathway based on a change in a pressure at one or more of the first pressure sensor or the second pressure sensor from at least one of: the first pressure measurement or the second pressure measurement.

Clause 2. The system of clause 1, wherein the at least one computing device is further configured to: determine a third pressure measurement at the second pressure sensor subsequent to the second pressure measurement; and determine the leak as being between the backflow preventer and the at least one dispensing valves in response to the change in pressure comprising the third pressure measurement is less than the second pressure measurement.

Clause 3. The system of clause 1, wherein the at least one computing device is further configured to: determine a third pressure measurement at the first pressure sensor subsequent to the first pressure measurement; and determine the leak as being between the backflow preventer and the inlet valve in response to the change in pressure comprising the third pressure measurement is less than the first pressure measurement.

Clause 4. The system of clause 1, wherein the at least one computing device is further configured to: determine a decreasing pressure over time at the first pressure sensor; determine a decreasing pressure over time at the second pressure sensor; and determine that the decreasing pressure at the first pressure sensor and the second pressure sensor are substantially similar; and in response to the decreasing pressure at the first pressure sensor and the second pressure sensor being substantially similar, determine the leak as being between the backflow preventer and the at least one dispensing valves.

Clause 5. The system of clause 1, wherein the at least one computing device is further configured to: determine a decreasing pressure over time at the second pressure sensor; and determine that the decreasing pressure at the second pressure sensor is above a pressure at the first pressure sensor; and in response to the decreasing pressure at the second pressure sensor being above a pressure at the first pressure sensor, determine the leak as being between the backflow preventer and the at least one dispensing valves.

Clause 6. The system of clause 1, wherein the at least one dispensing valve comprises an ambient valve and a still valve.

Clause 7. The system of clause 1, wherein the backflow preventer comprises a first side on a direction toward the inlet valve and a second side in a direction toward the demand pump, and the backflow preventer is configured to prevent fluid from moving from the second side to the first side when a pressure at the first side is below a pressure at the second side.

Clause 8. The system of clause 1, further comprising a buffer tank and a filter positioned between the inlet valve and the backflow preventer.

Clause 9. A method, comprising: detecting, via a computing device, completion of a fluid dispensing event based on a pressure measurement from a second pressure sensor positioned between a demand pump and at least one dispensing valves; after a predefined duration from completion of the fluid dispensing event, determining, via a computing device, a first pressure measurement at a first pressure sensor between a backflow preventer and an inlet valve and a second pressure measurement at the second pressure sensor; and determining, via a computing device, a leak in a fluid pathway based on a change in a pressure at one or more of the first pressure sensor or the second pressure sensor from at least one of: the first pressure measurement or the second pressure measurement.

Clause 10. The method of clause 9, wherein after the fluid dispensing event and while the at least one dispensing valves are closed, fluid flows from a first fluid line between the demand pump and the at least one dispensing valves back through the demand pump to equalize pressure with a second fluid line between the backflow preventer and the demand pump.

Clause 11. The method of clause 9, wherein detecting the completion of the fluid dispensing event comprises: determining a raise in pressure across a particular pressure threshold; and detecting the completion of the fluid dispensing event based on the raise in pressure over the particular pressure threshold.

Clause 12. The method of clause 9, further comprising turning off the demand pump in response to detecting a completion of the fluid dispensing event.

Clause 13. The method of clause 9, further comprising: detect a drop in pressure from a first pressure to a second pressure at the second pressure sensor; in response to identifying the drop in pressure, determining a start of a fluid dispensing event and turn on a pump; and identifying a raise in pressure from the second pressure to a third pressure at the second pressure sensor, wherein the first pressure is greater than the third pressure.

Clause 14. The method of clause 13, wherein a start time of the fluid dispensing event comprises a time when the drop in pressure from the first pressure to the second pressure was detected.

Clause 15. A cabinet assembly, comprising: an inlet valve; a backflow preventer; a first pressure sensor coupled to at least one computing device, wherein the first pressure sensor is configured to measure pressure between the backflow preventer and the inlet valve; a second pressure sensor coupled to the at least one computing device, wherein the second pressure sensor is configured to measure pressure between the backflow preventer and at least one dispensing valves; and the at least one computing device is configured to: detect completion of a fluid dispensing event based on a pressure measurement from the second pressure sensor; after a predefined duration from completion of the fluid dispensing event, determine a first pressure measurement at the first pressure sensor and a second pressure measurement at the second pressure sensor; and determine a leak in a fluid pathway based on a change in a pressure at one or more of the first pressure sensor or the second pressure sensor from at least one of: the first pressure measurement or the second pressure measurement.

Clause 16. The cabinet assembly of clause 15, wherein the at least one dispensing valves comprises a solenoid valve.

Clause 17. The cabinet assembly of clause 15, wherein: the inlet valve is coupled to a water source at an inlet side and a filter at an outlet side; the filter is coupled to the backflow preventer; the backflow preventer is coupled to a demand pump; and the demand pump is coupled to the at least one dispensing valves.

Clause 18. The cabinet assembly of clause 17, wherein the demand pump directly coupled to a first dispensing valve of the at least one dispensing valves and coupled to a second dispensing valve of the at least one dispensing valves through a chiller.

Clause 19. The cabinet assembly of clause 17, wherein each of the at least one dispensing valves is coupled to a nozzle for dispensing a fluid.

Clause 20. The cabinet assembly of clause 15, wherein the at least one computing device is further configured to determine a start and end of the fluid dispensing event based exclusively on pressure readings at the second pressure sensor.

These and other aspects, features, and benefits of the claims will become apparent from the detailed written description of the aforementioned aspects taken in conjunction with the accompanying drawings, although variations and modifications thereto may be effected without departing from the spirit and scope of the novel concepts of the disclosure.

What is claimed is:

1. A system, comprising:
an inlet valve;
a backflow preventer;
a demand pump;
a first pressure sensor coupled to at least one computing device, wherein the first pressure sensor is configured to measure pressure between the backflow preventer and the inlet valve;
a second pressure sensor coupled to the at least one computing device, wherein the second pressure sensor is configured to measure pressure between the demand pump and at least one dispensing valves; and
the at least one computing device is configured to:
    detect completion of a fluid dispensing event based on a pressure measurement from the second pressure sensor;
    after a predefined duration from completion of the fluid dispensing event, determine a first pressure measurement at the first pressure sensor and a second pressure measurement at the second pressure sensor; and
    determine a leak in a fluid pathway based on a change in a pressure at one or more of the first pressure sensor or the second pressure sensor from at least one of: the first pressure measurement or the second pressure measurement.

2. The system of claim 1, wherein the at least one computing device is further configured to:
determine a third pressure measurement at the second pressure sensor subsequent to the second pressure measurement; and
determine the leak as being between the backflow preventer and the at least one dispensing valves in response to the change in pressure comprising the third pressure measurement is less than the second pressure measurement.

3. The system of claim 1, wherein the at least one computing device is further configured to:
determine a third pressure measurement at the first pressure sensor subsequent to the first pressure measurement; and
determine the leak as being between the backflow preventer and the inlet valve in response to the change in pressure comprising the third pressure measurement is less than the first pressure measurement.

4. The system of claim 1, wherein the at least one computing device is further configured to:
determine a decreasing pressure over time at the first pressure sensor;
determine a decreasing pressure over time at the second pressure sensor; and
determine that the decreasing pressure at the first pressure sensor and the second pressure sensor are approximately the same; and
in response to the decreasing pressure at the first pressure sensor and the second pressure sensor being approximately the same, determine the leak as being between the backflow preventer and the at least one dispensing valves.

5. The system of claim 1, wherein the at least one computing device is further configured to:
determine a decreasing pressure over time at the second pressure sensor; and
determine that the decreasing pressure at the second pressure sensor is above a pressure at the first pressure sensor; and
in response to the decreasing pressure at the second pressure sensor being above a pressure at the first pressure sensor, determine the leak as being between the backflow preventer and the at least one dispensing valves.

6. The system of claim 1, wherein the at least one dispensing valve comprises an ambient valve and a still valve.

7. The system of claim 1, wherein the backflow preventer comprises a first side on a direction toward the inlet valve and a second side in a direction toward the demand pump, and the backflow preventer is configured to prevent fluid from moving from the second side to the first side when a pressure at the first side is below a pressure at the second side.

8. The system of claim 1, further comprising a buffer tank and a filter positioned between the inlet valve and the backflow preventer.

9. A method, comprising:
detecting, via a computing device, completion of a fluid dispensing event based on a pressure measurement from a second pressure sensor positioned between a demand pump and at least one dispensing valves;
after a predefined duration from completion of the fluid dispensing event, determining, via a computing device, a first pressure measurement at a first pressure sensor between a backflow preventer and an inlet valve and a second pressure measurement at the second pressure sensor; and
determining, via a computing device, a leak in a fluid pathway based on a change in a pressure at one or more of the first pressure sensor or the second pressure sensor from at least one of: the first pressure measurement or the second pressure measurement.

10. The method of claim 9, wherein after the fluid dispensing event and while the at least one dispensing valves are closed, fluid flows from a first fluid line between the demand pump and the at least one dispensing valves back through the demand pump to equalize pressure with a second fluid line between the backflow preventer and the demand pump.

11. The method of claim 9, wherein detecting the completion of the fluid dispensing event comprises:
determining a raise in pressure across a particular pressure threshold; and
detecting the completion of the fluid dispensing event based on the raise in pressure over the particular pressure threshold.

12. The method of claim 9, further comprising turning off the demand pump in response to detecting a completion of the fluid dispensing event.

13. The method of claim 9, further comprising:
detect a drop in pressure from a first pressure to a second pressure at the second pressure sensor;
in response to identifying the drop in pressure, determining a start of a fluid dispensing event and turn on a pump; and identifying a raise in pressure from the second pressure to a third pressure at the second pressure sensor, wherein the first pressure is greater than the third pressure.

14. The method of claim 13, wherein a start time of the fluid dispensing event comprises a time when the drop in pressure from the first pressure to the second pressure was detected.

15. A cabinet assembly, comprising:
an inlet valve;
a backflow preventer;
a first pressure sensor coupled to at least one computing device, wherein the first pressure sensor is configured to measure pressure between the backflow preventer and the inlet valve;
a second pressure sensor coupled to the at least one computing device, wherein the second pressure sensor is configured to measure pressure between the backflow preventer and at least one dispensing valves; and
the at least one computing device is configured to:
detect completion of a fluid dispensing event based on a pressure measurement from the second pressure sensor;
after a predefined duration from completion of the fluid dispensing event, determine a first pressure measurement at the first pressure sensor and a second pressure measurement at the second pressure sensor; and
determine a leak in a fluid pathway based on a change in a pressure at one or more of the first pressure sensor or the second pressure sensor from at least one of: the first pressure measurement or the second pressure measurement.

16. The cabinet assembly of claim 15, wherein the at least one dispensing valves comprises a solenoid valve.

17. The cabinet assembly of claim 15, wherein:
the inlet valve is coupled to a water source at an inlet side and a filter at an outlet side;
the filter is coupled to the backflow preventer;
the backflow preventer is coupled to a demand pump; and
the demand pump is coupled to the at least one dispensing valves.

18. The cabinet assembly of claim 17, wherein the demand pump directly coupled to a first dispensing valve of the at least one dispensing valves and coupled to a second dispensing valve of the at least one dispensing valves through a chiller.

19. The cabinet assembly of claim 17, wherein each of the at least one dispensing valves is coupled to a nozzle for dispensing a fluid.

20. The cabinet assembly of claim 15, wherein the at least one computing device is further configured to determine a start and end of the fluid dispensing event based exclusively on pressure readings at the second pressure sensor.

* * * * *